US011330576B2

(12) United States Patent
Pan et al.

(10) Patent No.: US 11,330,576 B2
(45) Date of Patent: May 10, 2022

(54) METHOD FOR MONITORING PDCCH, TERMINAL AND NETWORK DEVICE

(71) Applicant: VIVO MOBILE COMMUNICATION CO., LTD., Dongguan (CN)

(72) Inventors: Xueming Pan, Dongguan (CN); Xiaodong Shen, Dongguan (CN); Lei Jiang, Dongguan (CN); Zhi Lu, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 123 days.

(21) Appl. No.: 16/637,918

(22) PCT Filed: Aug. 2, 2018

(86) PCT No.: PCT/CN2018/098290
§ 371 (c)(1),
(2) Date: Feb. 10, 2020

(87) PCT Pub. No.: WO2019/029427
PCT Pub. Date: Feb. 14, 2019

(65) Prior Publication Data
US 2020/0205134 A1 Jun. 25, 2020

(30) Foreign Application Priority Data
Aug. 11, 2017 (CN) .......................... 201710687280.1

(51) Int. Cl.
*H04W 72/04* (2009.01)
(52) U.S. Cl.
CPC .................. *H04W 72/042* (2013.01)

(58) Field of Classification Search
CPC . H04W 72/04; H04W 24/08; H04W 72/0453; H04W 72/0446; H04W 72/042; H04L 5/0048; H04L 12/24
See application file for complete search history.

(56) References Cited

U.S. PATENT DOCUMENTS

| 2018/0227777 | A1* | 8/2018 | Sun | ........................ H04W 24/08 |
| 2018/0277762 | A1* | 9/2018 | Ha | ........................ H01L 51/006 |
| 2018/0367386 | A1* | 12/2018 | Liao | ........................ H04W 48/00 |
| 2019/0215212 | A1* | 7/2019 | Park | ........................ H04L 5/0007 |

(Continued)

OTHER PUBLICATIONS

Chinese Search Report Application No. 201710687280.1; dated Oct. 8, 2019.

(Continued)

*Primary Examiner* — Chi Ho A Lee
(74) *Attorney, Agent, or Firm* — von Briesen & Roper, s.c.

(57) ABSTRACT

A method for monitoring a PDCCH, a terminal and a network device are provided. The method includes: determining configuration information of at least one control resource set (CORESET); and transmitting the configuration information of the at least one CORESET to a terminal; where the at least one CORESET is configured per carrier or per bandwidth part (BWP), and the carrier comprises at least one BWP. In a case that the at least one CORESET is configured per carrier, one carrier is configured with at least one CORESET; and in a case that the at least one CORESET is configured per BWP, one BWP is configured with at least one CORESET.

18 Claims, 8 Drawing Sheets

(56) References Cited

U.S. PATENT DOCUMENTS

| | | | | |
|---|---|---|---|---|
| 2020/0021419 | A1* | 1/2020 | Taherzadeh Boroujeni | ................ H04L 5/0091 |
| 2020/0099500 | A1* | 3/2020 | Huang | ............. H04W 72/0446 |
| 2020/0169956 | A1* | 5/2020 | Sun | .................... H04W 72/042 |
| 2020/0187094 | A1* | 6/2020 | Horiuchi | ............. H04W 72/042 |
| 2020/0213065 | A1* | 7/2020 | Takeda | ................ H04L 5/0082 |
| 2020/0314845 | A1* | 10/2020 | Miao | ................ H04W 72/0453 |
| 2021/0127367 | A1* | 4/2021 | Yi | .................... H04W 72/0453 |

OTHER PUBLICATIONS

European Search Report Application No. 18843762.8; dated Jul. 15, 2020.

International Search Report & Written Opinion related to Application No. PCT/CN2018/098290; reported on Oct. 17, 2018.

Intel Corporation; "CORESETs for NR PDCCH", 3GPP TSG RAN WG1 NR Adhoc #2, R1-1710543, Qingdao, P.R. China, Jun. 27, 2017-Jun. 30, 2017.

Intel Corporation; "Open issues for wider bandwidth operations", 3GPP TSG RAN WG1 NR Ad-Hoc#2, R1-1710583, Qingdao, P.R. China, Jun. 27, 2017-Jun. 30, 2017.

Interdigital Inc.; "Control Channels Monitoring with Multiple CORESETs", 3GPP TSG RAN WG1 Meeting #89, R1-1709016, Hangzhou, P.R. China May 15, 2017-May 19, 2017.

Huawei, Hisllicon; "Configuration of control resource set", 3GPP TSG RAN WG1 NR Ad Meeting. R1-1709951, Qingdao, China, Jun. 27, 2017-Jun. 30, 2017.

Guangdong Oppo Mobile Telecom; "Bandwidth part configuration and frequency resource allocation", 3GPP TSG RAN WG1 NR Ad-R1-1710164, Qingdao, P.R. China, Jun. 27, 2017-Jun. 30, 2017.

Interdigital Inc.; "CORESET Monitoring Under Dynamic Change of BWP", 3GPP TSG RAN WG1 NR Ad-Hoc #2, R1-1710872, Qingdao, China Jun. 27, 2017-Jun. 30, 2017.

* cited by examiner

METHOD FOR MONITORING PDCCH, TERMINAL AND NETWORK DEVICE

CROSS-REFERENCE TO RELATED APPLICATION

This patent application is a 35 USC § 371 U.S. national stage of International Application No. PCT/CN2018/098290 filed on Aug. 2, 2018, which claims a priority to Chinese Patent Application No. 201710687280.1 filed on Aug. 11, 2017, which are incorporated in their entireties by reference herein.

TECHNICAL FIELD

The present disclosure relates to the technical field of wireless communications, and in particular to a method for monitoring a PDCCH, a terminal and a network device.

BACKGROUND

In the $5^{th}$ Generation (5G) mobile communication system, a high bandwidth (for example, 100 MHZ or more) is usually used to transmit data. Terminals have different bandwidth capabilities. In order to enable terminals with low bandwidth capabilities to access a part of the bandwidth in a high bandwidth network, the concept of bandwidth part (BWP) is introduced into a new radio (NR) system. In the NR system, one or more BWPs can be configured for a terminal, and when multiple BWPs are configured for a terminal, the BWPs can adopt a same numerology or different numerologies, so that the terminal can access a BWP of a high bandwidth network. For a scenario where a network device configures one or more BWP for one terminal, the issue of PDCCH monitoring by the terminal has not been discussed accordingly.

SUMMARY

In a first aspect, the present disclosure provides a method for monitoring a physical downlink control channel (PDCCH), which is applied to a network device and includes:

determining configuration information of at least one control resource set (CORESET); and transmitting the configuration information of the at least one CORESET to a terminal, where the at least one CORESET is configured per carrier or per bandwidth part (BWP), and the carrier includes at least one BWP, where in a case that the at least one CORESET is configured per carrier, one carrier is configured with at least one CORESET; and in a case that the at least one CORESET is configured per BWP, one BWP is configured with at least one CORESET.

In a second aspect, the present disclosure provides a method for monitoring a PDCCH, which is applied to a terminal and includes:

receiving configuration information of at least one control resource set (CORESET), where the at least one CORESET is configured per carrier or per bandwidth part (BWP), and the carrier includes at least one BWP; in a case that the at least one CORESET is configured per carrier, one carrier is configured with at least one CORESET; and in a case that the at least one CORESET is configured per BWP, one BWP is configured with at least one CORESET; and monitoring the PDCCH in the at least one CORESET in accordance with the configuration information of the at least one CORESET.

In a third aspect, the present disclosure provides a network device, which includes:

a determination unit, configured to determine configuration information of at least one control resource set (CORESET); and a transmission unit, configured to transmit the configuration information of the at least one CORESET to a terminal; where the at least one CORESET is configured per carrier or per bandwidth part (BWP), and the carrier includes at least one BWP, where in a case that the at least one CORESET is configured per carrier, one carrier is configured with at least one CORESET; and in a case that the at least one CORESET is configured per BWP, one BWP is configured with at least one CORESET.

In a fourth aspect, the present disclosure provides a terminal, which includes:

a reception unit, configured to receive configuration information of at least one control resource set (CORESET), where the at least one CORESET is configured per carrier or per bandwidth part (BWP), and the carrier includes at least one BWP; in a case that the at least one CORESET is configured per carrier, one carrier is configured with at least one CORESET; and in a case that the at least one CORESET is configured per BWP, one BWP is configured with at least one CORESET; and a monitoring unit, configured to monitor a physical downlink control channel (PDCCH) in the at least one CORESET in accordance with the configuration information of the at least one CORESET.

In a fifth aspect, the present disclosure provides a terminal. The terminal includes a processor, a memory, and a program that is stored on the memory and executable on the processor. When executing the program, the processor is configured to perform steps of the method for monitoring a PDCCH provided in the first aspect.

In a sixth aspect, the present disclosure provides a computer-readable storage medium. The computer-readable storage medium stores a program, and the program is executed by a processor to perform steps of the method for monitoring a PDCCH provided in the first aspect.

In a seventh aspect, the present disclosure provides a network device, which includes a processor, a memory, and a program that is stored on the memory and executable on the processor. When executing the program, the processor is configured to perform steps of the method for monitoring a PDCCH provided in the second aspect.

In an eighth aspect, the present disclosure provides a computer-readable storage medium, on which a program is stored. The program, when executed, configures a processor to perform steps of the method for monitoring a PDCCH provided in the second aspect.

BRIEF DESCRIPTION OF THE DRAWINGS

In order to illustrate technical solutions of embodiments of the present disclosure more clearly, drawings used in the description of the embodiments of the present disclosure are briefly described below. Obviously, the drawings in the following description are only some embodiments of the present disclosure, and for a person of ordinary skill in the art, other drawings can be obtained based on these drawings without creative efforts.

DETAILED DESCRIPTION

Figure 1:
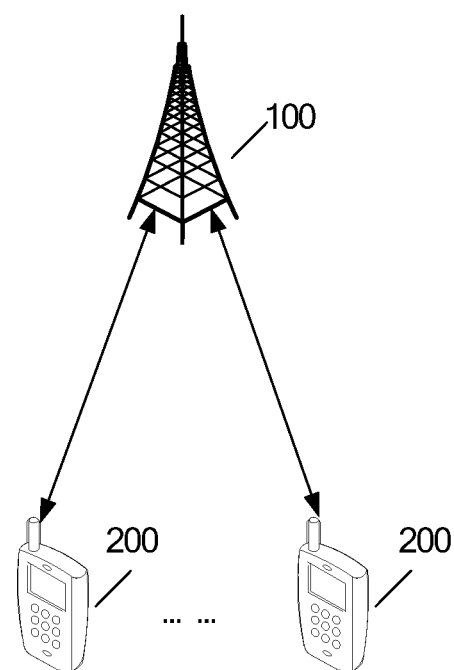
FIG. 1 is an architecture diagram of a communication system to which technical solutions are applicable according to an embodiment of the present disclosure.

Exemplary embodiments of the present disclosure will be described below in more detail with reference to the accompanying drawings. Although the exemplary embodiments of the present disclosure are shown in the drawings, it should be understood that the present disclosure can be implemented in various forms and should not be limited by the embodiments set forth herein. On the contrary, these embodiments are provided to enable a thorough understanding of the present disclosure, and to fully convey the scope of the present disclosure to those skilled in the art.

The technical solutions provided by the present disclosure can be applied to various communication systems, for example, $5^{th}$ Generation (5G) communication systems, future evolution systems, or multiple communication convergence systems, and can be applied in a variety of application scenarios, for example, machine-to-machine (M2M), device-to-device (D2D), macro communication, enhanced mobile Broadband (eMBB), ultra reliable and low latency communication (uRLLC) and massive machine type communication (mMTC). These scenarios include, but not limited to, communication between a terminal and a terminal, or communication between a network device and a network device, or communication between a network device and a terminal. The embodiments of the present disclosure can be applied to communications among network devices and terminals in a 5G communication system, or communications among terminals and terminals in a 5G communication system, or communications among network devices and network devices in a 5G communication system.

FIG. 1 shows a schematic diagram of an optional structure of a communication system according to an embodiment of the present disclosure. As shown in FIG. 1, the communication system includes at least one network device 100 (only one is shown in FIG. 1) and one or more terminals 200 connected to each network device 100. The network device 100 may be a base station, a core network device, a transmission reference point (TRP), a relay station, or an access point. The network device 100 may be: a base transceiver station (BTS) in a global system for mobile communication (GSM) or a code division multiple access (CDMA) network, or a NodeB (NB) in a wideband code division multiple access (WCDMA), or an eNB or an evolutional NodeB (eNodeB) in LTE. The network device 100 may also be a wireless controller in a cloud radio access network (CRAN) scenario. The network device 100 may also be a network device in a 5G communication system or a network device in a future evolved network, and may also be a wearable device or a vehicle-mounted device.

The terminal 200 may be a wireless terminal or a wired terminal. The wireless terminal may be a device that provides data connectivity of voice and/or other services to a user, a handheld device with a wireless communication function, a computing device, or other processing devices connected to a wireless modem, a vehicle-mounted device, a wearable device, a terminal in a future 5G network, or a terminal in a future evolved public land mobile network (PLMN) network. A wireless terminal may communicate with one or more core networks over a radio access network (RAN). The wireless terminal may be a mobile terminal such as a mobile phone (also referred to as a "cellular" phone) and a computer with a mobile terminal, which, for example, may be a portable, pocket-size, handheld, computer-built or vehicle-mounted mobile device. The wireless terminal exchanges language and/or data with a wireless access network, and may include a personal communication service (PCS) phone, a cordless phone, a session initiation protocol (SIP) phone, a wireless local loop (WLL) station, a personal digital assistant (PDA), and other devices. The wireless terminal may also be: a mobile device, a user equipment (UE), a UE terminal, an access terminal, a wireless communication equipment, a terminal unit, a terminal station, a mobile station, a remote station, a remote terminal, a subscriber unit, a subscriber station, a user agent, a terminal device, etc. The forgoing is just as an example, and a terminal is not limited to thereto in practical applications.

Some terms involved in the present disclosure are explained below for understanding of readers.

1. Control Resource Set (CORESET)

CORESET is a type of time-frequency resource set introduced in NR, that is, a terminal performs physical downlink control channel (PDCCH) detection at a corresponding CORESET. CORESET includes a set of resource element groups (REGs).

For example, configuration information of a CORESET may be notified in at least one of the following manners:

configuration information of the CORESET being notified through high-layer signaling; or configuration information of the CORESET being transmitted via a broadcast channel, system information, and the like; or configuration information of the CORESET being pre-defined based on one or more pieces of information such as a system bandwidth, a subcarrier spacing, an antenna configuration, or a carrier frequency.

The configuration information of a CORESET in the present specification includes, but not limited to, at least one piece of the following information: time-frequency resource information of the CORESET, and a set of aggregation levels at which a PDCCH requires to be blindly detected in the CORESET, the number of PDCCH candidate resources on which a PDCCH requires to be blindly detected in the CORESET at each aggregation level, or a DCI parameter (a DCI format or a length of DCI) of a PDCCH requiring to be blindly detected in the CORESET. The time-frequency resource information of a CORESET includes frequency-domain resource information of the CORESET (such as the number of PRBs, and a time-frequency position), and time-domain resource information (such as the number of OFDM symbols).

2. Bandwidth Part (BWP)

A terminal can be configured with one or more BWPs, and when multiple BWPs are configured for a terminal, the BWPs can adopt a same numerology or different numerologies. Generally, a position of a BWP in a carrier may be determined by a center frequency of the BWP.

The solutions provided by the present disclosure is mainly applied in a scenario where a network device configures one or more BWPs for a terminal. Some BWP application scenarios are given below.

Figure 2:
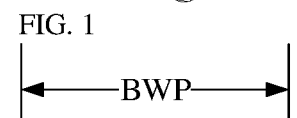
FIG. 2 is a schematic diagram of a BWP scenario according to an embodiment of the present disclosure.

In a first scenario, as shown in FIG. 2, a terminal accesses a BWP of a system bandwidth.

Figure 3:
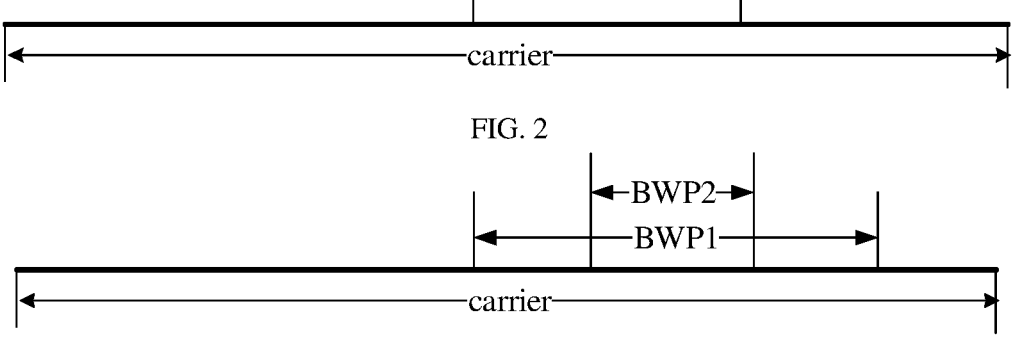
FIG. 3 is another schematic diagram of a BWP scenario according to an embodiment of the present disclosure.

In a second scenario, as shown in FIG. 3, a BWP for a terminal is adjusted, a center frequency of the BWP is unchanged, and a bandwidth of the BWP is changed.

Figure 4:
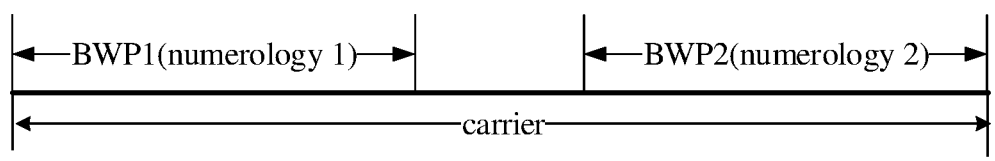
FIG. 4 is another schematic diagram of a BWP scenario according to an embodiment of the present disclosure.

In a third scenario, as shown in FIG. 4, a terminal accesses two BWPs in a system bandwidth, and the two BWPs have different numerologies.

Exemplarily, a downlink BWP and an uplink BWP for a terminal can be configured by a network device, respectively.

Exemplarily, one BWP (specified by Rel-15 technical specification) or multiple BWPs (specified by a technical specification in a later release) may be configured for a terminal.

Exemplarily, a terminal may perform BWP adjustment based on indication of Layer 1 (L1) signaling or Layer 2 (L2) signaling transmitted by a network device, which includes any of the following cases:

in a first case, a center frequency of a BWP is unchanged, and a bandwidth of the BWP changes, where it should be noted that RF retuning is not required in the first case; or in a second case, a center frequency of a BWP changes, and a bandwidth of the BWP is unchanged; or in a third case, a center frequency of a BWP changes, and a bandwidth of the BWP changes.

3. Downlink Control Information (DCI)

In a LTE system, a physical downlink control channel (PDCCH) is transmitted in a downlink sub-frame, and the PDCCH and a physical downlink shared channel (PDSCH) are in a time division multiplexing (TDM) relation. The PDCCH is transmitted through the first to the third orthogonal frequency division multiplexing (OFDM) symbols of a downlink sub-frame. Specifically, as shown in FIG. 1, generally, a control region for transmitting a PDCCH in the LTE system (that is, the first to the third subcarriers of a downlink sub-frame) is composed of logically divided CCEs. A basic unit of a time-frequency resource of a DCI carried on the PDCCH is also a control channel element (CCE). DCI can be transmitted at different aggregation levels (ALs). The aggregation level refers to the number of CCEs that carry a DCI. The aggregation level may be, for example but not limited to: 1, 2, 4, 8, 16, and 32. For example, an aggregation level of 2 means that a DCI is carried on 2 CCEs.

For example, a CCE includes, but not limited to, 6 resource element groups (REGs). The 6 REGs may be constructed in a concentrated or distributed way when constructing a CCE, which is not limited herein. By way of example, 12 consecutive REs (which does not include a RE occupied by a reference signal) constitute one REG. RE is the smallest time-frequency resource unit. RE may be uniquely identified by an index pair (k,l), k is an index of a subcarrier, and l is an index of a symbol.

4. Blind Decoding

As described above, a DCI can be transmitted in the first to the third symbols of a sub-frame, and a DCI can be transmitted at different aggregation levels. However, since the PDCCH is a signaling transmitted by the base station, and the UE has not received any other information except some system information before this transmission, the UE does not know the number of CCEs, a location of a CCE, a DCI format for transmitting a CCE, or an aggregation level of the DCI. Therefore, the UE needs to detect possible time-frequency resource locations of the DCI and possible aggregation levels of the DCI through blind detection, so as to receive the DCI. That is, a UE monitors a PDCCH transmitted by the base station by using a blind detection method to obtain the DCI.

It should be noted that the UE needs to blindly detect a control channel in every non-DRX (discontinuous reception) downlink sub-frame.

In order to reduce the complexity of blind detection of a UE, two search spaces are defined in the LTE system, namely a common search space (CSS) and a UE-specific search space (UESS). The size of a search space uses the number of CCEs as a unit. CSS is mainly used to transmit DCI for scheduling cell-specific control information (for example, system information, paging messages, and multi-cast power control information), and search needs to be performed for each user. UESS is mainly used to transmit a DCI for resources scheduling for each UE. For a CSS, the CSS includes the first 16 CCEs in each downlink sub-frame, and an aggregation level of a PDCCH may be 4 or 8. Therefore, when a user searches a common search space, the user searches for four times starting from CCE 0 and according to an AL of 4, and then searches twice at an AL of 8. For a UCSS, since a starting position of a CCE of the UCSS of each UE in a downlink sub-frame is related to a sub-frame number or the RNTI of the UE, etc., starting points of various UEs for search are different, that is, a PDCCH aggregation level can be 1, 2, 4, or 8 in UCSS. That AL is equal to 1 refers to performing search for six times, that AL is equal to 2 refers to performing search for six times, that AL is equal to 4 refers to performing search twice, and that that AL is equal to 8 refers to performing search twice.

In view of the above, if the number of blind detections is represented based on an aggregation level being L, it is specified in the LTE that for UCSS, when L={1, 2, 4, 8}, the number of blind detections is {6, 6, 2, 2}; and for CSS, When L={4, 8}, the number of blind detections is {4, 2}. For details, reference can be made to a correspondence between a search space where a UE needs to perform blind detection in a downlink sub-frame and the number of blind detections to be attempted, which is as shown in Table 1 below. The number of attempting blind detections indicates the number of PDCCH candidates.

TABLE 1

| type | search space | | |
|---|---|---|---|
| | aggregation level | size of search space | number of blind detections |
| UE-specific search space | 1 | 6 | 6 |
| | 2 | 12 | 6 |
| | 4 | 8 | 2 |
| | 8 | 16 | 2 |
| public search space | 4 | 16 | 4 |
| | 8 | 16 | 2 |

Referring to Table 1, it can be seen that the number of CSS searches is six and the number of UCSS searches is 16. In UCSS, a DCI format for a UE at the same moment has only two payload sizes, so search needs to be performed twice, that is, for 32 times. When a UE performs blind detection in a PDCCH search space, the UE only needs to attempt to decode a DCI that may occur, and does not need to match all DCI formats. Although a relevant technical specification has not yet been determined, in the NR system, there is a limit to the maximum number of blind detections.

5. Other Terms

Such term as "and/or" in this specification is only a kind of association relationship describing related objects, and refers to that there may be three kinds of relationships. For example, "A and/or B" may refer to three cases: A exists alone, both A and B exist simultaneously, and B exists alone. In addition, the symbol "l" in this specification generally indicates that the related objects are in an "or" relationship, while in the formula, the symbol "l" indicates that the related objects are in a "divide" relationship. If not specified, such terms as "a plurality of" or "multiple" herein refer to two or more.

In order to clearly describe the technical solutions of embodiments of the present disclosure, in the embodiments of the present disclosure, such terms as "first", "second", or the like in the specification and claims of embodiments of the present disclosure are used to distinguish same objects or similar objects having basically the same functions or applications. Those skilled in the art may appreciate that such terms as "first", "second", or the like are not to limit the number of the object or a performing order of the objects.

In the embodiments of the present disclosure, words such as "exemplary" or "for example" are used as example, illustration or description. Any embodiment or design scheme described as "exemplary" or "for example" in the embodiments of the present disclosure should not be construed as more optional or advantageous than other embodiments or design schemes. More exactly, the use of the words "exemplary" or "for example" are intended to present relevant concepts in a specific manner.

Figure 5:
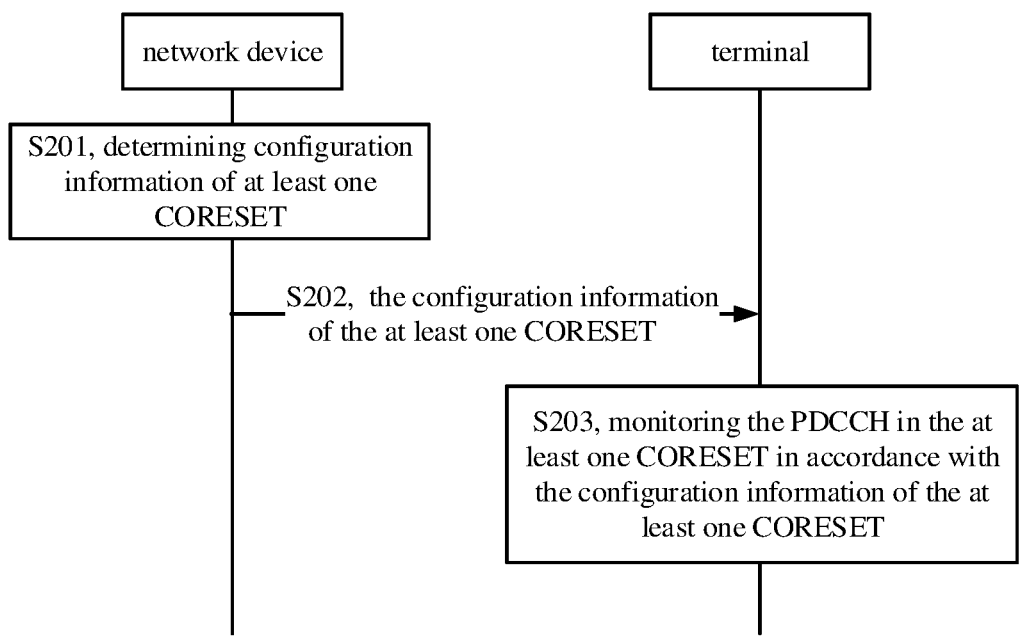
FIG. 5 is a schematic flowchart of a method for monitoring a PDCCH according to an embodiment of the present disclosure.

FIG. 5 is a schematic flowchart of a method for monitoring a PDCCH provided by the present disclosure. The solutions provided by embodiments of the present disclosure are directed to a scenario where a network device configures one or more BWPs for a terminal, and the terminal is in a BWP operating mode. The method specifically includes steps S201 to S203.

In step S201, a network device determines configuration information of at least one control resource set (CORESET).

The at least one CORESET may be configured in a unit of a carrier, or may be configured in a unit of a bandwidth part (BWP). Specifically, in a case that the at least one CORESET is configured in a unit of a carrier, one carrier is configured with at least one CORESET, and the number of CORESETs configured for a carrier may be different from the number of CORESETs configured for another carrier, which is not limited herein. In a case that the at least one CORESET is configured in a unit of a BWP, one BWP is configured with at least one CORESET, the number of CORESETs configured for a BWP may be different from the number of CORESETs configured for another BWP, which is not limited herein.

In step S202, the network device transmits the configuration information of the at least one CORESET to a terminal.

In step S203, the terminal monitors the PDCCH in the at least one CORESET in accordance with the configuration information of the at least one CORESET.

The network device configures CORESETs on a carrier or on a BWP for the terminal, and the terminal in a BWP operating mode in a CORESET can perform PDCCH detection in the configured CORESETs that fall within a BWP where the terminal currently operates. Therefore, PDCCH blind detection can be realized for a terminal in a BWP operating mode.

Figure 6:
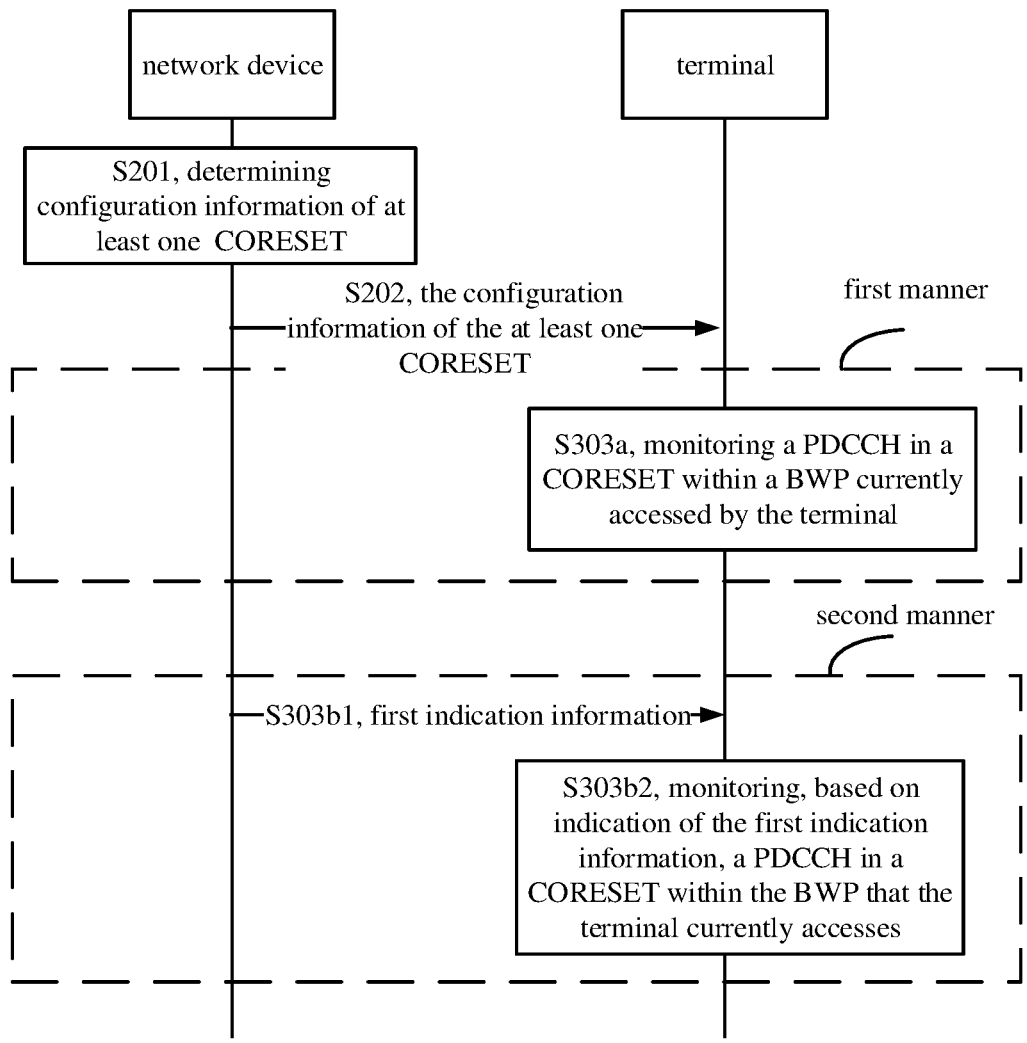
FIG. 6 is another schematic flowchart of a method for monitoring a PDCCH according to an embodiment of the present disclosure.

FIG. 6 is a schematic flowchart of a method for monitoring a PDCCH provided by the present disclosure. This embodiment is directed to a scenario where a terminal is in a BWP operating mode. When monitoring a PDCCH in at least one CORESET, the terminal needs to determine a CORESET that needs to be monitored from all configured CORESETs. The process of determining the CORESET that needs to be monitored from the configured CORESET by the terminal may be specifically implemented by two implementation manners. Therefore, based on steps S201 and S203 provided in the above embodiment, in this embodiment, step S203 may be replaced with step S303a, or step S203 may be replaced with S303b1 and S303b2 according to different implementation manners.

As shown in FIG. 6, a first manner is an implicit determination method (that is, a terminal implicitly determines a CORESET that needs to be monitored according to a correspondence between a CORESET and a BWP).

Specifically, step S303a is substituted for step S203, and the method includes: step S303a. In step S303a, the terminal monitors, in accordance with the configuration information of the at least one CORESET, the PDCCH in at least one complete CORESET and/or at least one incomplete CORESET within a BWP currently accessed by the terminal.

As shown in FIG. 6, a second manner is an explicit determination method (that is, a base station transmits a signaling instruction to a terminal, to indicate the terminal the CORESET that needs to be monitored).

Specifically, steps S303b1 and S303b2 are substituted for step S203, and the method includes: steps S303b1 and S303b2. In step S303b1, the network device transmits first indication information to the terminal, where the first indication information is used to instruct the terminal to monitor at least one complete CORESET and/or at least one incomplete CORESET within a BWP that the terminal currently accesses.

Exemplarily, a terminal may directly determine which CORESET is selected to be monitored from pre-configured CORESETs according to a signaling instruction from the base station. The signaling instruction may be a PDCCH signaling instruction or a MAC CE signaling instruction.

In step S303b2, the terminal monitors, based on indication of the first indication information, the PDCCH in the at least one complete CORESET and/or the at least one incomplete CORESET within the BWP that the terminal currently accesses.

As an example, in a case that the at least one CORESET is configured per carrier, whether a method used to determine a CORESET that needs to be monitored is the first manner or the second manner as mentioned above, a CORESET falling within a BWP that a terminal is currently accessing may be a complete CORESET and/or an incomplete CORESET configured for a carrier on which the terminal is currently located. It should be noted that the incomplete CORESET in the present disclosure does not refer to an imperfect CORESET, but refers to a part of a pre-configured CORESET frequency-domain resource, that is, only a part of a time-frequency resource of the complete CORESET are used.

In a first embodiment, in a case that the CORESET(s) is configured based on a carrier, a terminal determines at least one complete CORESET in a set of CORESETs for a carrier where the terminal is currently located, and monitors a PDCCH in the determined complete CORESET(s), where the at least one complete CORESET falls within a BWP that is currently accessed by the terminal.

Figure 7:
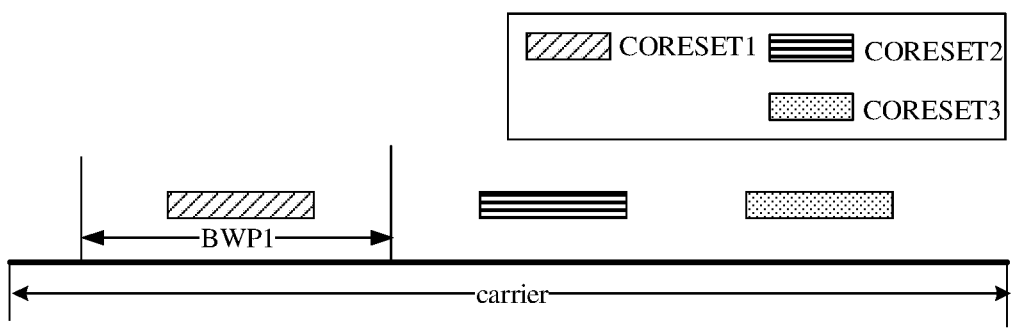
FIG. 7 is another schematic diagram of a BWP scenario where a CORESET is monitored according to an embodiment of the present disclosure.

For example, as shown in FIG. 7, CORESETs are configured based on a carrier, and three CORESETs are configured on the carrier (CORESET1, CORESET2, and CORESET3 in FIG. 7). If CORESET1 falls into BWP1 currently accessed by the terminal, and CORESET1 is a complete CORESET, the terminal only needs to monitor CORESET1 that falls into BWP1. In the process of determining, by the terminal, a CORESET that needs to be monitored in BWP1, the terminal may implicitly determine the CORESET according to a correspondence between a CORESET and a BWP, that is, determining the CORESET falling within a bandwidth of BWP1, or may determine which one of the three pre-configured CORESETs is selected for specific monitoring based on indication information transmitted by a network device In a second embodiment, in a case that the CORESET(s) is configured based on a carrier, a terminal determines at least one incomplete CORESET in a CORESET set for a carrier where the terminal is currently located, and monitors a PDCCH in the determined incomplete CORESET(s), where the at least one incomplete CORESET falls within a BWP that is currently accessed by the terminal.

Figure 8:
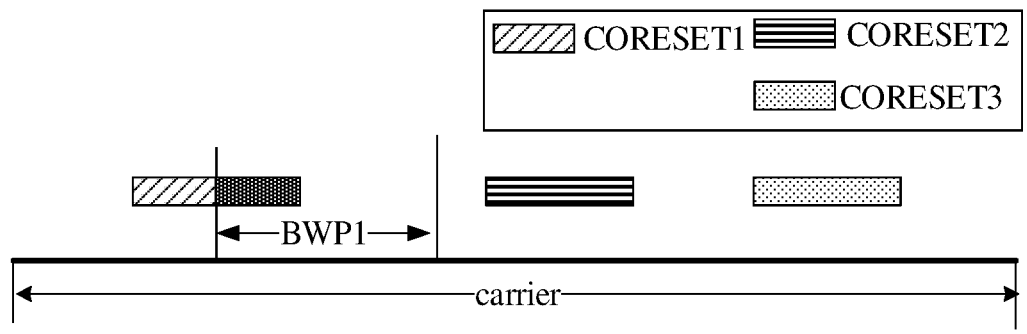
FIG. 8 is another schematic diagram of a BWP scenario where a CORESET is monitored according to an embodiment of the present disclosure.

For example, as shown in FIG. 8, CORESETs are configured based on a carrier, and three CORESETs (CORESET1, CORESET2, and CORESET3 in FIG. 8) are configured on the carrier, if part of CORESET1 falls into BWP1 currently accessed by the terminal, and CORESET1 is an incomplete CORESET, (referring to FIG. 8, only a part of a time-frequency resource of CORESET1 falls within a bandwidth of BWP1), the terminal only needs to monitor the part of CORESET1 that falls into BWP1. In the process of determining a CORESET that needs to be monitored in BWP1 by the terminal, the terminal may implicitly determine the CORESET according to a correspondence between a CORESET and a BWP, or may determine which one of the three pre-configured CORESETs is selected and which part of the one selected CORESET is selected for specific monitoring based on indication information transmitted by a network device.

In a third embodiment, in a case that the CORESET(s) is configured based on a carrier, a terminal determines that at least one complete CORESET and at least one incomplete CORESET of at least one complete CORESET in a CORESET set for a carrier where the terminal is currently located, where the at least one complete CORESET and the at least one incomplete CORESET fall within the BWP that the terminal currently accesses.

Figure 9:
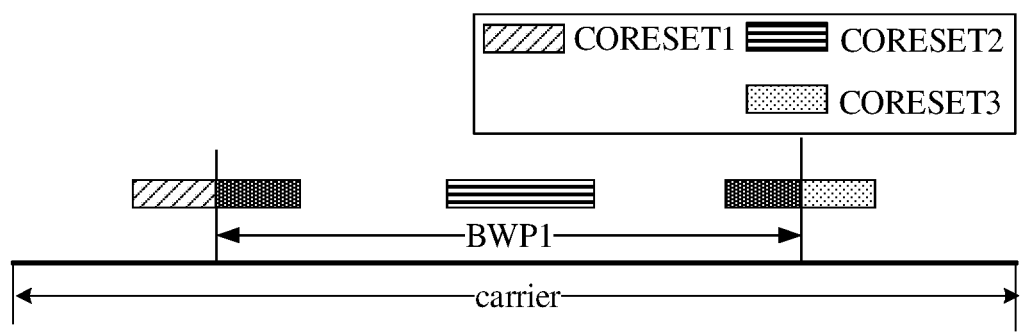
FIG. 9 is another schematic diagram of a BWP scenario where a CORESET is monitored according to an embodiment of the present disclosure.

For example, as shown in FIG. 9, CORESETs are configured based on a carrier, and three CORESETs are configured on the carrier (CORESET1, CORESET2, and CORESET3 in FIG. 6). If CORESET1, CORESET2, and CORESET3 all fall into BWP1 currently accessed by the terminal, and CORESET1 and CORESET3 that fall into BWP1 are incomplete CORESET (referring to FIG. 9, only a part of a time-frequency resource of CORESET1 and only a part of a time-frequency resource of CORESET3 fall within a bandwidth of BWP1), the terminal needs to monitor the complete CORESET2, and the part of CORESET1 and the part of CORESET3 that fall into BWP1, and of course, the terminal may only monitor any of the three CORESETs. In the process of determining a CORESET that needs to be monitored in BWP1 by the terminal, the terminal may implicitly determine the CORESET according to a correspondence between a CORESET and a BWP, or may determine which one of the three pre-configured CORESETs is selected or which part of the one CORESET is selected for specific monitoring based on indication information transmitted by a network device.

Exemplarily, in a case that at least one CORESET configured by a network device for a terminal in the present disclosure is configured in a unit of BWP, whether a method used to determine a CORESET that needs to be monitored is the first manner or the second manner as mentioned above, a CORESET falling within a BWP that a terminal is currently accessing is always a complete CORESET.

Figure 10:
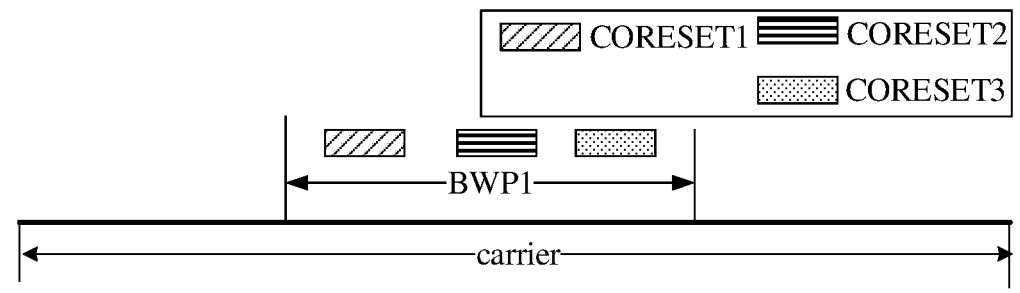
FIG. 10 is another schematic diagram of a BWP scenario where a CORESET is monitored according to an embodiment of the present disclosure.
Figure 11:
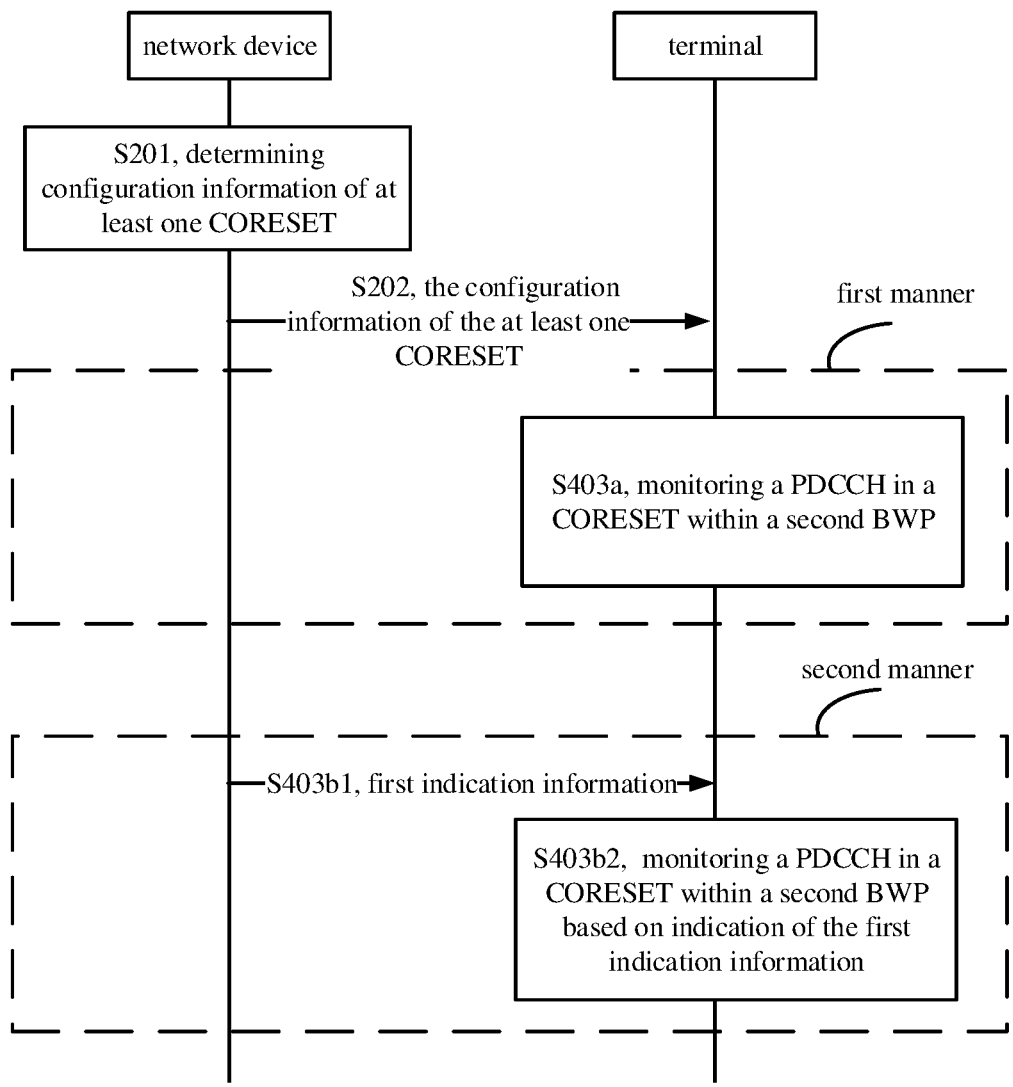
FIG. 11 is another schematic flowchart of a method for monitoring a PDCCH according to an embodiment of the present disclosure.

For example, as shown in FIG. 10, CORESETs are configured based on a BWP, and three CORESETs are configured on BWP1 (CORESET1, CORESET2, and CORESET3 in FIG. 10). When a terminal currently accesses BWP1, the terminal may directly select a CORESET from the three CORESETs for monitoring, or may determine which one of the three pre-configured CORESETs is selected for specific monitoring based on indication information transmitted by a network device FIG. 11 is a schematic flowchart of a method for monitoring a PDCCH provided by the present disclosure. This embodiment is directed to a scenario where a terminal is in a BWP operating mode and the terminal is switched from a first BWP to a second BWP, where the first BWP is a BWP that is currently accessed and the second BWP is a target BWP. It should be noted that the scenario where the terminal is switched from the first BWP to the second BWP in this embodiment includes: a BWP switching scenario and a BWP adjustment scenario (for example, a bandwidth of the BWP that the terminal currently accesses changes, and/or a center frequency of the BWP that the terminal currently accesses changes).

When monitoring a PDCCH in at least one CORESET, the terminal needs to determine a CORESET that needs to be monitored from all configured CORESETs. The process of determining the CORESET that needs to be monitored from the configured CORESET by the terminal may be specifically implemented by two implementation manners. Therefore, based on steps S201 and S203 provided in the above embodiment, in this embodiment, step S203 may be replaced with S403a, or step S203 may be replaced with steps S403b1 and S403b2 according to implementation manners.

As shown in FIG. 11, a first manner is an implicit determination method (that is, a terminal implicitly determines a CORESET that needs to be monitored according to a correspondence between a CORESET and a BWP).

Specifically, step S203 is replaced with steps S403a, and the method includes: steps S403a. In step S403a, the terminal monitors, in accordance with the configuration information of the at least one CORESET, the PDCCH in at least one complete CORESET and/or at least one incomplete CORESET within a second BWP, in a case that the terminal is switched from a first BWP to the second BWP.

As shown in FIG. 11, a second manner is an explicit determination method (that is, a base station transmits a signaling instruction to a terminal, to indicate the terminal the CORESET that needs to be monitored).

Specifically, step S203 is replaced with steps S403b1 and S403b2, and the method includes: steps S403b1 and S403b2.

In step S403b1, the network device transmits first indication information to the terminal, where the first indication information is used to instruct the terminal to monitor at least one complete CORESET and/or at least one incomplete CORESET within the second BWP.

In step S403b2, the terminal monitors, based on indication of the first indication information, the PDCCH in the at least one complete CORESET and/or the at least one incomplete CORESET within the second BWP.

Optionally, the at least one CORESET configured by the network device for the terminal is configured per carrier.

Exemplarily, the above step S403a includes: A1, the terminal monitoring, based on indication of the first indication information, a PDCCH in at least one complete CORESET and/or at least one incomplete CORESET of all CORESETs that correspond to a first carrier, where the at least one complete CORESET and/or the at least one incomplete CORESET falls within the second BWP, and the first carrier includes the first BWP and the second BWP.

Optionally, the first indication information in the above step S403b1 is used to instruct a terminal to monitor at least one complete CORESET and/or at least one incomplete CORESET among all CORESETs that correspond to a first carrier, where the at least one complete CORESET and/or the at least one incomplete CORESET falls within the second BWP, and the first carrier includes the first BWP and the second BWP.

Specifically, the above S403b2 includes: B1, monitoring the PDCCH in at least one CORESET and/or at least one incomplete CORESET among all the CORESETs that correspond to the first carrier based on indication of the first indication information and the configuration information of the at least one CORESET, where the at least one complete CORESET and/or the at least one incomplete CORESET falls within the second BWP.

Figure 12:
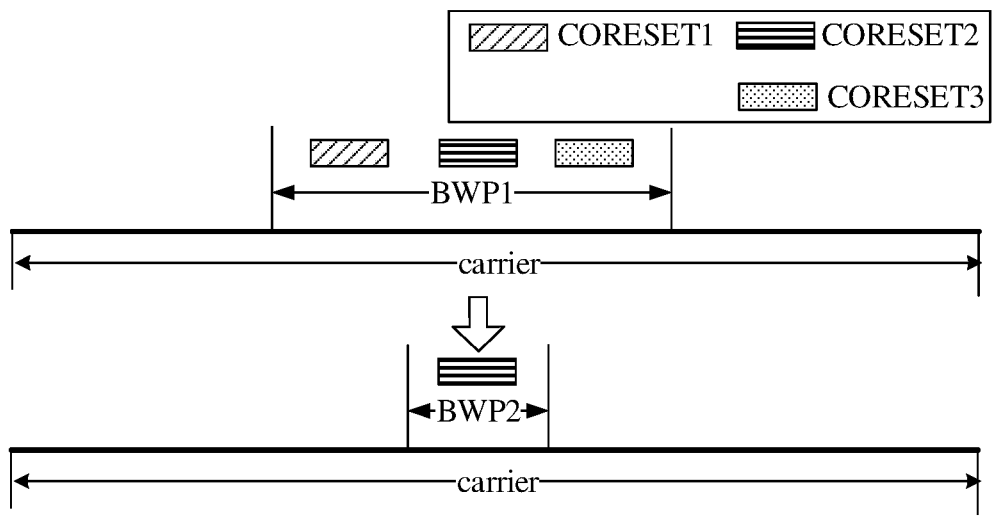
FIG. 12 is a schematic diagram of a BWP switching scenario where a CORESET is monitored according to an embodiment of the present disclosure.

In a first example as shown in FIG. 12, CORESETs are configured based on a carrier, three CORESETs (CORESET1, CORESET2, CORESET3 in FIG. 12) are configured on the carrier, and CORESET1, CORESET2, CORESET3 configured on the carrier fall into BWP1. When a terminal switches from BWP1 to BWP2, the terminal only monitors CORESET2 that falls into BWP2. In a process of determining a CORESET that needs to be monitored in BWP2 by the terminal, the terminal may implicitly determine the CORESET according to a correspondence between CORESETs and BWPs, or may select a CORESET from the three pre-configured CORESETs for specific monitoring based on indication information transmitted by a network device.

Figure 13:
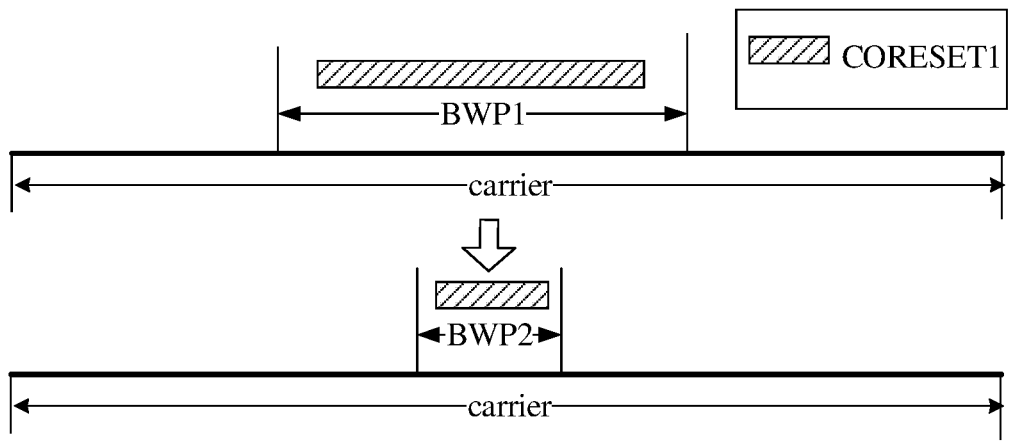
FIG. 13 is another schematic diagram of a BWP switching scenario where a CORESET is monitored according to an embodiment of the present disclosure.

In a second example as shown in FIG. 13, a CORESET is configured based on a carrier, CORESET1 is configured on the carrier, and CORESET1 falls into BWP1. When a terminal switches from BWP1 to BWP2, the terminal only monitors a part of CORESET1 that falls within BWP2. In a process of determining a CORESET that needs to be monitored in BWP2 by the terminal, the terminal may implicitly determine the CORESET according to a correspondence between CORESETs and BWPs, or may select a part of CORESET1 for specific monitoring based on indication information transmitted by a network device.

Figure 14:
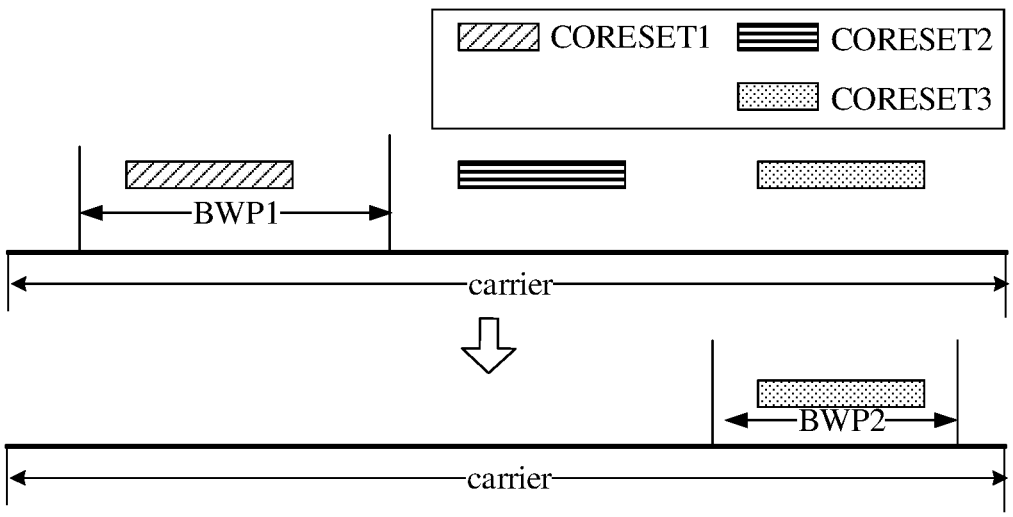
FIG. 14 is another schematic diagram of a BWP switching scenario where a CORESET is monitored according to an embodiment of the present disclosure.

In a third example as shown in FIG. 14, CORESETs are configured based on a carrier, and three CORESETs (CORESET1, CORESET2, and CORESET3 in FIG. 14) are configured on the carrier, and CORESET1 configured on the carrier falls into BWP1. When a terminal switches from BWP1 to BWP2, the terminal only monitors CORESET3 that falls into BWP2. In a process of determining a CORESET that needs to be monitored in BWP2 by the terminal, the terminal may implicitly determine the CORESET according to a correspondence between CORESETs and BWPs, or may select a CORESET from the three pre-configured CORESETs for specific monitoring based on indication information transmitted by a network device.

Optionally, at least one CORESET configured by a network device for a terminal is configured per BWP.

Exemplarily, the above step S403a includes: A2, the terminal monitoring, in accordance with the configuration information of the at least one CORESET, a PDCCH in at least one CORESET of all CORESETs that correspond to a second BWP.

Exemplarily, the first indication information in the above step S403b1 is used to instruct the terminal to monitor at least one CORESET among all CORESETs corresponding to the second BWP.

Specifically, the above step S403b2 includes: B2, monitoring the PDCCH in at least one CORESET among all the CORESETs that correspond to the second BWP based on indication of the first indication information and the configuration information of the at least one CORESET.

Figure 15:
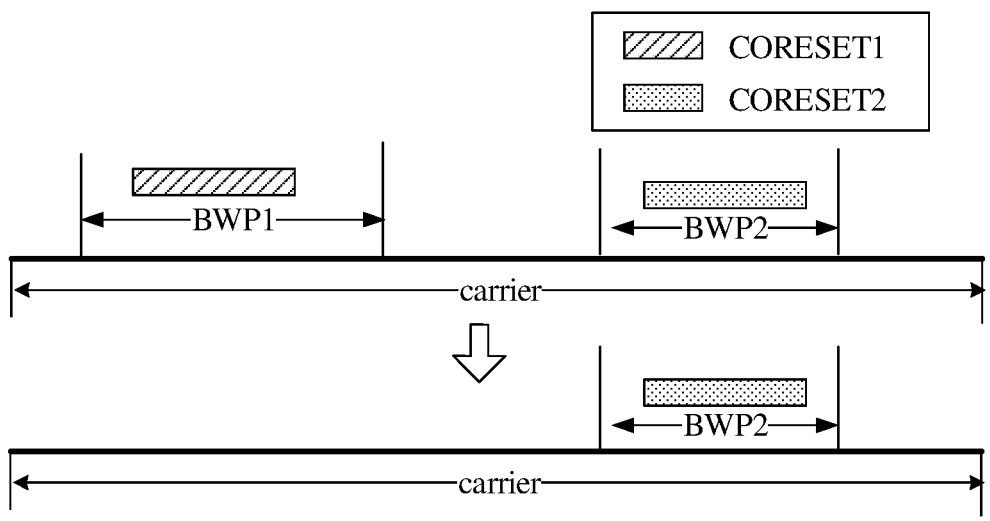
FIG. 15 is another schematic diagram of a BWP switching scenario where a CORESET is monitored according to an embodiment of the present disclosure.
Figure 16:
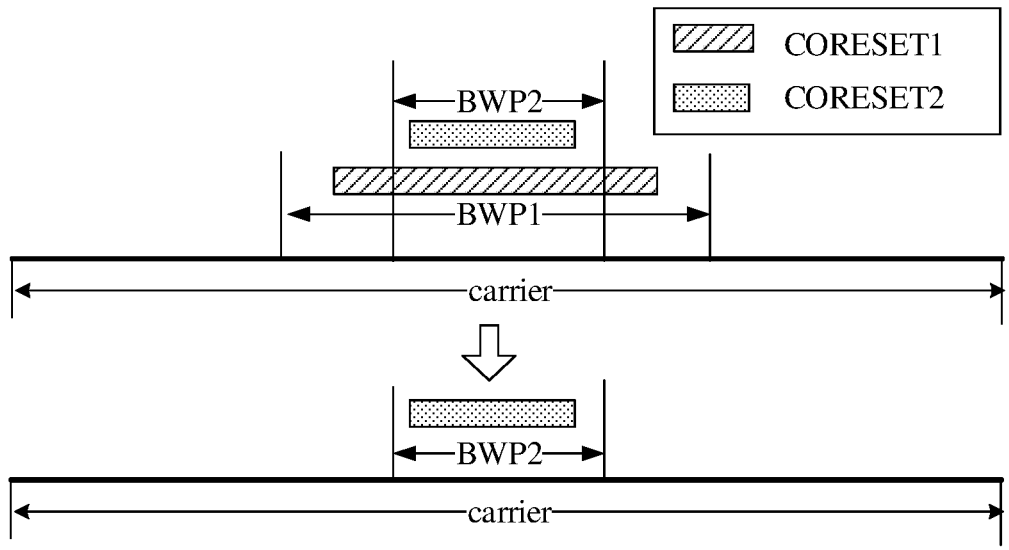
FIG. 16 is another schematic diagram of a BWP switching scenario where a CORESET is monitored according to an embodiment of the present disclosure.

In a fourth example as shown in FIG. 15 and FIG. 16, a CORESET is configured in BWP1 and BWP2 for a terminal (as shown in FIG. 15 and FIG. 16, BWP1 is configured with CORESET1 and BWP2 is configured with CORESET2). After the terminal is switched from BWP1 to BWP2, the terminal only monitors CORESET2 configured for BWP2. In a process of determining a CORESET that needs to be monitored in BWP2 by the terminal, the terminal may implicitly determine the CORESET according to a correspondence between CORESETs and BWPs, or may select a CORESET from pre-configured CORESET1 and CORESET2 for specific monitoring based on indication information transmitted by a network device. As shown in FIG. 13, center frequencies of BWP1 and BWP2 are the same. As shown in FIG. 14, center frequencies of BWP1 and BWP2 are different. Therefore, when CORESETs are configured based on a BWP, only a CORESET in a BWP to which the terminal has switched needs to be considered for monitoring.

Figure 17:
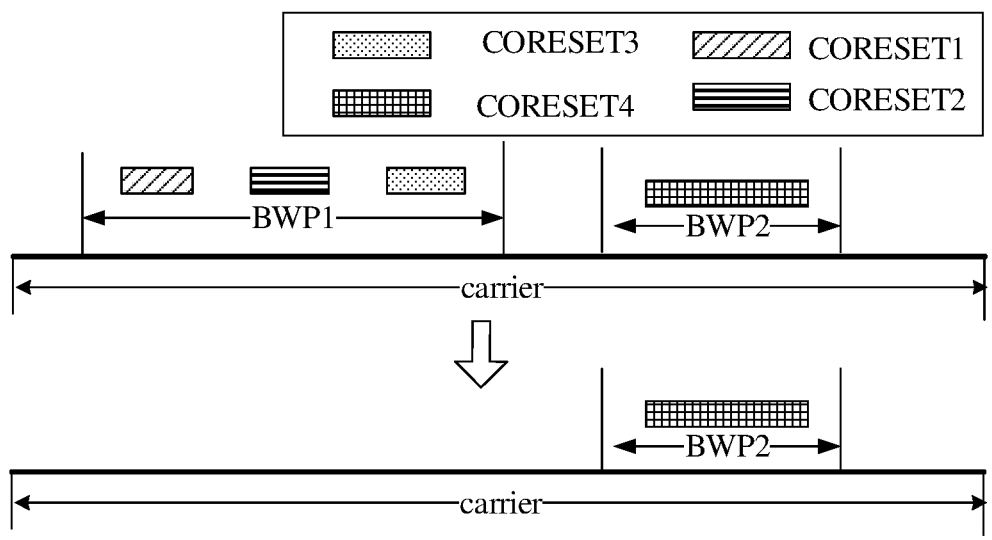
FIG. 17 is another schematic diagram of a BWP switching scenario where a CORESET is monitored according to an embodiment of the present disclosure.

In a fifth example as shown in FIG. 17, three CORESETs are configured in BWP1, and one CORESET is configured in BWP2 for a terminal (as shown in FIG. 17, BWP1 is configured with CORESET1 to CORESET3, and BWP2 is configured with CORESET4). When a terminal is switched from BWP1 to BWP2, the terminal only monitors CORESET4 configured for BWP2. In a process of determining a CORESET that needs to be monitored in BWP2 by the terminal, the terminal may implicitly determine the CORESET according to a correspondence between CORESETs and BWPs, or may select a CORESET from the pre-configured CORESET1 to CORESET4 for specific monitoring based on indication information transmitted by a network device.

Optionally, in a case that a terminal switches from a first BWP to a second BWP, and a network device and the terminal have a vague understanding of the switching time, the following method may be adopted to ensure service continuity.

Exemplarily, in a case that a PDCCH DCI parameter changes as a bandwidth of a BWP for a terminal changes (that is, a DCI parameter of a first BWP before the switching (such as a DCI format or a length of DCI) is different from a DCI parameter of a second BWP after the switching), the corresponding solution includes at least one of:

C1, the network device transmitting a DCI parameter corresponding to the first BWP and a DCI parameter corresponding to the second BWP to the terminal; or C2, the terminal detecting a DCI parameter corresponding to the second BWP.

Accordingly, in a case that a location of a BWP that a terminal accesses changes (that is, a center frequency of the first BWP before the switching is different from a center frequency of the second BWP after the switching), the corresponding solution includes at least one of:

D1, the network device transmitting DCI to the terminal in a CORESET corresponding to the first BWP, and transmitting DCI to the terminal in a CORESET corresponding to the second BWP; or D2, detecting, within the second BWP, DCI transmitted by a network device in a CORESET corresponding to the second BWP.

In this way, when a bandwidth of a BWP for a terminal changes, and a network device has ambiguous understanding of the switching time, the network device transmits a DCI parameter of a BWP before the switching and a DCI parameter of a BWP after the switching, so that the terminal can receive the DCI parameter of the BWP after the switching, thereby ensuring that the terminal can successfully receive DCI when monitoring a PDCCH in the BWP. Similarly, when a location of a BWP for a terminal changes, and a network device has ambiguous understanding of the switching time, the network device schedules the terminal by transmitting DCI in CORESETs corresponding to two BWPs before and after the switching, thereby ensuring that the terminal receives DCI in a CORESET of the BWP after the switching.

It should be noted that when a bandwidth of a BWP for a terminal and a location of a BWP for a terminal are both changed, the above steps C1 and C2, and the above steps D1 and D2 need to be performed.

The solutions provided by the embodiments of the present disclosure are described above mainly from the perspective of interaction between a network device and a terminal. It can be understood that, in order to implement the above functions, each network device or each terminal includes a hardware structure and/or a software module used to achieve a corresponding function. A person of ordinary skill in the art should easily realize that, in combination with the units and algorithm steps of the examples described in the embodiments of the present disclosure, the embodiments of the present disclosure can be implemented in the form of hardware or in the form of hardware combined with computer software. Whether a certain function is performed by hardware or computer software driven by hardware depends on specific applications and design constraints of a technical solution. A person skilled in the art can implement the described functions by using different methods for various specific applications, but such implementations should not be considered beyond the scope of the present application.

In the embodiments of the present disclosure, functional modules of a network device, a terminal, and the like can be divided according to the above method embodiments. For example, functional modules may be divided to correspond to respective functions, or two or more functions may be integrated into one processing module. The above integrated modules can be implemented in a form of hardware or software functional modules. It should be noted that the division of modules in the embodiments of the present disclosure is exemplary, and is only a logical function division. There may be other division manners in actual implementations.

Figure 18:
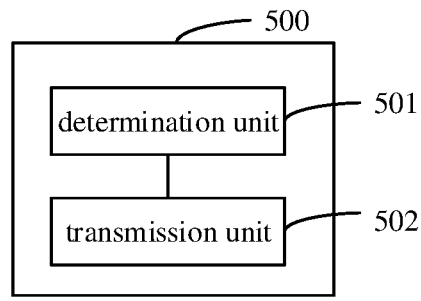
FIG. 18 is a schematic structural diagram of a terminal according to an embodiment of the present disclosure.

In a case that functional modules are divided according to various functions, FIG. 18 illustrates a possible structural diagram of a network device provided by the present disclosure. As shown in FIG. 18, a network device 500 may include: a determination unit 501 and a transmission unit 502.

The determination unit 501 is configured to determine configuration information of at least one control resource set (CORESET).

The transmission unit 502 is configured to transmit the configuration information of the at least one CORESET to a terminal; where the at least one CORESET is configured per carrier or per bandwidth part (BWP), and the carrier includes at least one BWP. In a case that the at least one CORESET is configured per carrier, one carrier is configured with at least one CORESET; and in a case that the at least one CORESET is configured per BWP, one BWP is configured with at least one CORESET.

Optionally, the transmission unit 502 is further configured to transmit first indication information to the terminal, and the first indication information is used to instruct the terminal to monitor at least one complete CORESET and/or at least one incomplete CORESET within a BWP that the terminal currently accesses.

Further optionally, in a case that the terminal is switched from a first BWP to a second BWP, the first indication information is used to instruct the terminal to monitor at least one complete CORESET and/or at least one incomplete CORESET within the second BWP.

Further optionally, in a case that the at least one CORESET is configured per carrier, the first indication information is used to instruct the terminal to monitor at least one complete CORESET and/or at least one incomplete CORESET of all CORESETs that correspond to a first carrier, the at least one complete CORESET and/or the at least one incomplete CORESET falls within the second BWP, and the first carrier includes the first BWP and the second BWP; or in a case that the at least one CORESET is configured per BWP, the first indication information is used to instruct the terminal to monitor at least one CORESET of all CORESETs corresponding to the second BWP.

Optionally, the transmission unit 502 is further configured to, in a case that the terminal is switched from a first BWP to a second BWP, transmit, to the terminal, a downlink control information (DCI) parameter corresponding to the first BWP and a DCI parameter corresponding to the second BWP, when the DCI parameter of the first BWP is different from the DCI parameter of the second BWP; and/or transmit, to the terminal, DCI in a CORESET corresponding to the first BWP, and transmitting, to the terminal, DCI in a CORESET corresponding to the second BWP, when a center frequency of the first BWP is different from a center frequency of the second BWP.

Optionally, the configuration information of each of the at least one CORESET includes at least one of: time-frequency resource information of the CORESET, a set of aggregation levels to be monitored in the CORESET, the number of PDCCH candidates to be monitored at each aggregation level in the CORESET, or a DCI parameter of a PDCCH to be monitored in the CORESET.

It should be noted that all relevant content of steps involved in the foregoing method embodiments can be applicable to functional descriptions of corresponding functional modules, which are not be repeated herein.

An embodiment of the present disclosure further provides a network device, including a processor, a memory, and a computer program stored on the memory and executable on the processor. The computer program is executed by the processor to implement processes of the method for monitoring the PDCCH in the above embodiments, and can achieve the same technical effects. To avoid repetition, details are not described herein again.

An embodiment of the present disclosure further provides a computer-readable storage medium. A computer program is stored on the computer-readable storage medium, and the computer program is executed by a processor to implement processes of the method for monitoring a PDCCH in the above embodiments, and can achieve the same technical effects. To avoid repetition, details are not described herein again. The computer-readable storage medium is, for example, a read-only memory (ROM), a random access memory (RAM), a magnetic disk or an optical disk.

Figure 19:
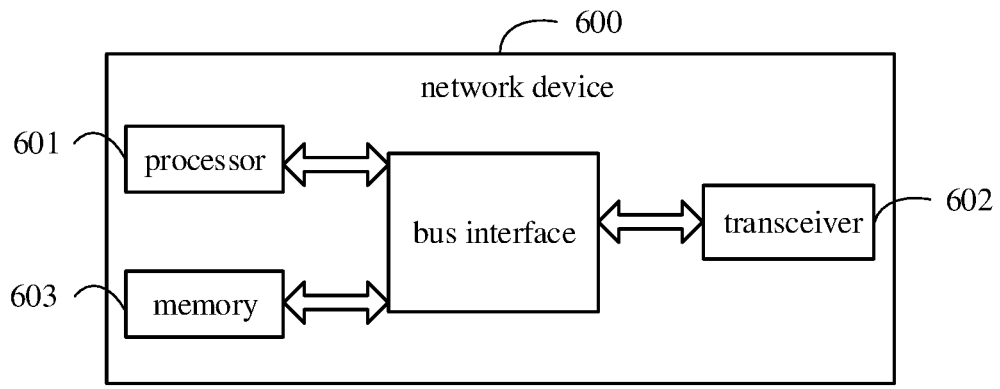
FIG. 19 is another schematic structural diagram of a terminal according to an embodiment of the present disclosure.

In case of using an integrated unit, an embodiment of the present disclosure further provides a network device, such as a base station. FIG. 19 is a structural diagram of a network device applied in an embodiment of the present disclosure, which can implement the details of the method in the above embodiments, can achieve the same technical effects. As shown in FIG. 19, a network device 600 includes: a processor 601, a transceiver 602, a memory 603 and a bus interface.

In an embodiment of the present disclosure, the network device 600 further includes a computer program stored in the memory 603 and executable on the processor 601. The computer program is executed by the processor 601 to implement the following steps:

a first step, determining configuration information of at least one control resource set (CORESET); and a second step, transmitting the configuration information of the at least one CORESET to a terminal, where the at least one CORESET is configured per carrier or per bandwidth part (BWP), and the carrier includes at least one BWP, in a case that the at least one CORESET is configured per carrier, one carrier is configured with at least one CORESET; and in a case that the at least one CORESET is configured per BWP, one BWP is configured with at least one CORESET.

In FIG. 19, a bus architecture may include any number of interconnected buses and bridges, and may be specifically configured to couple various circuits including one or more processors represented by the processor 601 and storages represented by the memory 603. The bus architecture may also couple various other circuits such as peripherals, voltage regulators and power management circuits, which are well known in the art. Therefore, a detailed description thereof is omitted herein. A bus interface provides an interface. The transceiver 602 may be multiple elements, i.e., including a transmitter and a receiver, to allow for communication with various other apparatuses on the transmission medium. The processor 601 is responsible for supervising the bus architecture and normal operation and the memory 603 may store the data used by the processor 601 during operation.

The processor 601 is responsible for managing the bus architecture and general processing, and the memory 603 may store data used by the processor 601 when performing operations.

Optionally, the computer program is executed by the processor 601 to implement the following steps:

a third step, transmitting first indication information to the terminal, where the first indication information is used to instruct the terminal to monitor at least one complete CORESET and/or at least one incomplete CORESET within a BWP that the terminal currently accesses.

Optionally, in a case that the terminal is switched from a first BWP to a second BWP, the first indication information is used to instruct the terminal to monitor at least one complete CORESET and/or at least one incomplete CORESET within the second BWP.

Further optionally, in a case that the at least one CORESET is configured per carrier, the first indication information is used to instruct the terminal to monitor at least one complete CORESET and/or at least one incomplete CORESET of all CORESETs that correspond to a first carrier, where the at least one complete CORESET and/or the at least one incomplete CORESET falls within the second BWP, and the first carrier includes the first BWP and the second BWP; or in a case that the at least one CORESET is configured per BWP, the first indication information is used to instruct the terminal to monitor at least one CORESET of all CORESETs corresponding to the second BWP Optionally, in a case that the terminal is switched from a first BWP to a second BWP, the computer program is executed by the processor 601 to further implement the following steps:

a fourth step, transmitting, to the terminal, a downlink control information (DCI) parameter corresponding to the first BWP and a DCI parameter corresponding to the second BWP, when the DCI parameter of the first BWP is different from the DCI parameter of the second BWP; and/or a fifth step, transmitting, to the terminal, DCI in a CORESET corresponding to the first BWP, and transmitting, to the terminal, DCI in a CORESET corresponding to the second BWP, when a center frequency of the first BWP is different from a center frequency of the second BWP.

Optionally, the configuration information of each of the at least one CORESET includes at least one of: time-frequency resource information of the CORESET, a set of aggregation levels to be monitored, the number of PDCCH candidates at each aggregation level to be monitored, or a DCI parameter of a PDCCH to be monitored in the CORESET.

For the analysis of the related content of the above first to fifth steps, reference may be made to the foregoing method embodiments, and details are not described herein again. In addition, the network device can implement the processes implemented by the network device in the foregoing embodiments. To avoid repetition, details are not described herein again. It should be noted that the present disclosure does not limit the sequence of the above steps performed by the network device. The execution order of the above steps should be determined by functions and internal logics of corresponding steps, that is, the sequence number of the above steps should not limit implementation processes in the embodiments of the present disclosure.

In the embodiments of the present disclosure, a network device configures one or more CORESETs for a terminal by transmitting configuration information of at least one CORESET to the terminal. The at least one CORESET may be configured by using a carrier as a unit or using a BWP as a unit. When operating in a BWP operating mode, the terminal selects a CORESET that needs to be monitored from pre-configured CORESETs, and monitors a PDCCH in the CORESET that needs to be monitored in accordance with the configuration information of at least one CORESET. Therefore, PDCCH blind detection can be realized for a terminal in a BWP operating mode.

Figure 20:
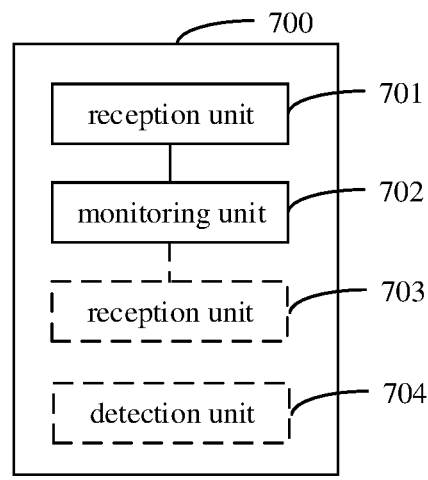
FIG. 20 is a schematic structural diagram of a network device according to an embodiment of the present disclosure.

In a case that functional modules are divided according to various functions, FIG. 20 shows a possible structural diagram of a terminal provided by the present disclosure. As shown in FIG. 20, a terminal 700 may include a reception unit 701 and a monitoring unit 702.

The reception unit 701 is configured to receive configuration information of at least one control resource set (CORESET), where the at least one CORESET is configured per carrier or per bandwidth part (BWP), and the carrier includes at least one BWP; in a case that the at least one CORESET is configured per carrier, one carrier is configured with at least one CORESET; and in a case that the at least one CORESET is configured per BWP, one BWP is configured with at least one CORESET.

The monitoring unit 702 is configured to monitor a physical downlink control channel (PDCCH) in the at least one CORESET in accordance with the configuration information of the at least one CORESET.

Optionally, the monitoring unit 702 is specifically configured to monitor the PDCCH in at least one complete CORESET and/or at least one incomplete CORESET within a BWP currently accessed by the terminal.

Further optionally, the monitoring unit 702 is specifically configured to monitor the PDCCH in at least one complete CORESET and/or at least one incomplete CORESET within a second BWP, in a case that the terminal is switched from a first BWP to the second BWP.

Further optionally, in a case that the terminal is switched from a first BWP to a second BWP, the monitoring unit 702 is specifically configured to:

monitor the PDCCH in at least one complete CORESET and/or at least one incomplete CORESET of all CORESETs that correspond to a first carrier, where the at least one complete CORESET and/or the at least one incomplete CORESET falls within the second BWP, in a case that the at least one CORESET is configured per carrier, where the first carrier includes the first BWP and the second BWP; or monitor the PDCCH in at least one CORESET of all CORESETs corresponding to the second BWP, in a case that the at least one CORESET is configured per BWP.

Optionally, as shown in FIG. 20, the terminal 700 further includes: a reception unit 703. The reception unit 703 is configured to receive first indication information transmitted by the terminal, and the first indication information is used to instruct the terminal to monitor at least one complete CORESET and/or at least one incomplete CORESET within a BWP that the terminal currently accesses. The monitoring unit 702 is further configured to monitor, based on indication of the first indication information, the PDCCH in the at least one complete CORESET and/or the at least one incomplete CORESET within the BWP that the terminal currently accesses.

Further optionally, in a case where the terminal is switched from a first BWP to a second BWP, and when the first indication information is used to instruct the terminal to monitor at least one complete CORESET and/or at least one incomplete CORESET within the second BWP, the monitoring unit 702 is specifically configured to monitor, based on indication of the first indication information, the PDCCH in the at least one complete CORESET and/or the at least one incomplete CORESET within the second BWP.

Further optionally, in a case that the at least one CORESET is configured per carrier, the first indication information is used to instruct the terminal to monitor at least one complete CORESET and/or at least one incomplete CORESET of all CORESETs that correspond to a first carrier, where the at least one complete CORESET and/or the at least one incomplete CORESET falls within the second BWP. The monitoring unit 702 is specifically configured to: monitor, based on indication of the first indication information, the PDCCH in the at least one complete CORESET and/or the at least one incomplete CORESET of all the CORESETs that correspond to the first carrier and fall within the second BWP, where the first carrier includes the first BWP and the second BWP; or in a case that the at least one CORESET is configured per BWP, the first indication information is used to instruct the terminal to monitor at least one CORESET of all CORESETs corresponding to the second BWP, and the monitoring unit is specifically configured to monitor, based on indication of the first indication information, the PDCCH in the at least one CORESET of all the CORESETs corresponding to the second BWP.

Optionally, in a case that the terminal is switched from a first BWP to a second BWP, the terminal 700 further includes a detection unit 704. The detection unit 704 is further configured to detect a downlink control information (DCI) parameter corresponding to the second BWP, when a DCI parameter of the first BWP is different from the DCI parameter of the second BWP; and/or, detect, within the second BWP, DCI transmitted by a network device in a CORESET corresponding to the second BWP, when a center frequency of the first BWP is different from a center frequency of the second BWP.

Optionally, the configuration information of each of the at least one CORESET includes at least one of: time-frequency resource information of the CORESET, a set of aggregation levels to be monitored, the number of PDCCH candidates at each aggregation level to be monitored, or a DCI parameter of a PDCCH to be monitored in the CORESET.

It should be noted that all relevant content of steps involved in the foregoing method embodiments can be applicable to functional descriptions of corresponding functional modules, which are not be repeated herein.

An embodiment of the present disclosure further provides a network device, including a processor, a memory, and a computer program stored on the memory and executable on the processor. The computer program is executed by the processor to implement processes of the method for monitoring a PDCCH in the above embodiments, and can achieve the same technical effects. To avoid repetition, details are not described herein again.

An embodiment of the present disclosure further provides a computer-readable storage medium. A computer program is stored on the computer-readable storage medium, and the computer program is executed by a processor to implement processes of the method for monitoring a PDCCH in the above embodiments, and can achieve the same technical effects. To avoid repetition, details are not described herein again. The computer-readable storage medium is, for example, a read-only memory (ROM), a random access memory (RAM), a magnetic disk or an optical disk.

Figure 21:
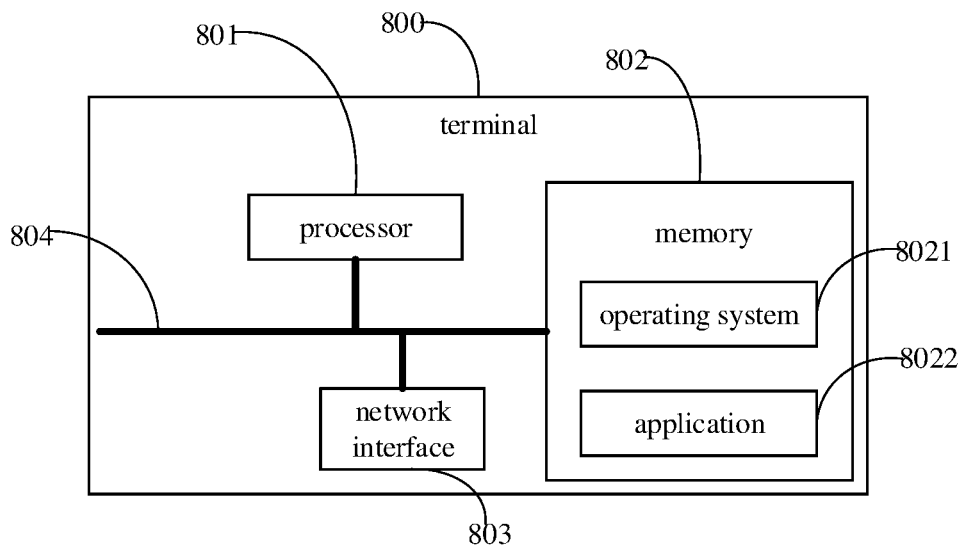
FIG. 21 is another schematic structural diagram of a network device according to an embodiment of the present disclosure.

In case of using an integrated unit, an embodiment of the present disclosure further provides a terminal. FIG. 21 is a block diagram of a terminal according to another embodiment of the present disclosure. A terminal 800 shown in FIG. 21 includes: at least one processor 801, a memory 802, and at least one network interface 803. Various components in the terminal 800 are coupled to each other via a bus system 804. It is understood that that the bus system 804 is configured to enable connections and communications among these components. In addition to the data bus, the bus system 804 includes a power bus, a control bus and a status signal bus. For clarity, various buses are all labeled as the bus system 804 in FIG. 21.

It is understood that, the memory 802 provided by embodiments of the present disclosure may be a volatile or non-volatile storage, or may include both of the volatile and non-volatile storages. The non-volatile storage may be a read-only memory (ROM), a programmable ROM (PROM), an erasable PROM (EPROM), an electrically EPROM (EEPROM) or a flash memory. The volatile storage may be a random access memory (RAM), which is used as an external cache. By way of example and without any limitation, many forms of RAMs may be used, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM). The memory 802 of the system and method described herein is meant to include, without limitation, these and any other suitable types of storages.

In some implementations, the memory 802 stores following elements: executable module or data structure, or a subset or extension set thereof, such as an operating system 8021 and an application 8022.

The operating system 8021 includes various system programs, such as framework layer programs, core library layer programs and driver layer programs, to implement various fundamental services and process hardware-based tasks. The application 8022 includes various applications, such as media player and browser, to implement a variety of application services. The program implementing the method according to embodiments of the present disclosure may be included in the application 8022.

In embodiments of the present disclosure, the terminal 800 may include: a computer program stored in the memory 802 and executable by the processor 801. The computer program is configured to be executed by the processor 801 to implement following steps:

a first step, receiving configuration information of at least one control resource set (CORESET), where the at least one CORESET is configured per carrier or per bandwidth part (BWP), and the carrier includes at least one BWP; in a case that the at least one CORESET is configured per carrier, one carrier is configured with at least one CORESET; and in a case that the at least one CORESET is configured per BWP, one BWP is configured with at least one CORESET; and a second step, monitoring the PDCCH in the at least one CORESET in accordance with the configuration information of the at least one CORESET.

The method disclosed in the foregoing embodiments of the present disclosure may be applied to the processor 801 or implemented by the processor 801. The processor 801 may be an integrated circuit with signal processing capability. During an implementation process, steps of the methods may be realized in form of hardware by integrated logical circuits in the processor 801, or in form of software by instructions. The processor 801 may be a general purpose processor, digital signal processor (DSP), application specific integrated circuit (ASIC), field programmable gate array (FPGA) or other programmable logic device, discrete gate or transistor logic device, discrete hardware transistor logic device, discrete hardware component, that is capable of implementing or executing the various methods, steps and logic block diagrams disclosed in the embodiments of the present disclosure. The general purpose processor may be a microprocessor, or any conventional processor, etc. The steps of the methods disclosed with reference to the embodiments of the present disclosure may be embodied in hardware in the form of a coding processor, or performed by the hardware in the coding processor and the software modules in combination. The software modules may reside in well-established storage medium in the art, such as a RAM, flash memory, ROM, PROM or EEPROM, register, etc. The storage medium resides in the memory 802. The processor 801 reads information from the memory 802 and performs the steps of the methods with its hardware.

It is understood that, the embodiments described in the present disclosure may be implemented by hardware, software, firmware, middleware, microcode or a combination thereof. For hardware implementation, processing units may be implemented in one or more application specific integrated circuits (ASIC), digital signal processor (DSP), DSP device (DSPD), programmable logic device (PLD), field-programmable gate array (FPGA), general purpose processor, controller, microcontroller, microprocessor, other electronic unit configured to perform the function described in this application or a combination thereof.

For software implementation, the technical solutions described in the embodiments of the present disclosure may be implemented by a module (e.g., process, function, etc.) configured to perform the function described in the embodiments of the present disclosure. Software code may be stored in a memory and executed by the processor. The memory may be implemented internal or external to the processor.

In specific, the computer program is configured to be executed by the processor 801 to implement following step:

a third step: monitoring, in accordance with the configuration information of the at least one CORESET, the PDCCH in at least one complete CORESET and/or at least one incomplete CORESET within a BWP currently accessed by the terminal.

Further optionally, the above third step specifically includes the following: a four step, monitoring, in accordance with the configuration information of the at least one CORESET, the PDCCH in at least one complete CORESET and/or at least one incomplete CORESET within a second BWP, in a case that the terminal is switched from a first BWP to the second BWP.

Further optionally, the above fourth step specifically includes:

monitoring the PDCCH in at least one complete CORESET and/or at least one incomplete CORESET of all CORESETs that correspond to a first carrier, where the at least one complete CORESET and/or the at least one incomplete CORESET falls within the second BWP, in a case that the at least one CORESET is configured per carrier, where the first carrier includes the first BWP and the second BWP; or monitoring the PDCCH in at least one CORESET of all CORESETs corresponding to the second BWP, in a case that the at least one CORESET is configured per BWP.

Optionally, the computer program is configured to be executed by the processor 801 to implement the following steps:

a fifth step, receiving first indication information transmitted by the terminal, where the first indication information is used to instruct the terminal to monitor at least one complete CORESET and/or at least one incomplete CORESET within a BWP that the terminal currently accesses; and a sixth step, monitoring, based on indication of the first indication information, the PDCCH in the at least one complete CORESET and/or the at least one incomplete CORESET within the BWP that the terminal currently accesses.

Further, in a case where the terminal is switched from a first BWP to a second BWP, when the first indication information is used to instruct the terminal to monitor at least one complete CORESET and/or at least one incomplete CORESET within the second BWP, the above sixth step includes the following step:

a seventh step: monitoring, based on indication of the first indication information, the PDCCH in the at least one complete CORESET and/or the at least one incomplete CORESET within the second BWP.

Further, in a case that the at least one CORESET is configured per carrier, the first indication information is used to instruct the terminal to monitor at least one complete CORESET and/or at least one incomplete CORESET of all CORESETs that correspond to a first carrier, where the at least one complete CORESET and/or the at least one incomplete CORESET falls within the second BWP, and the seventh step above specifically includes:

monitoring, based on indication of the first indication information, the PDCCH in the at least one complete CORESET and/or the at least one incomplete CORESET of all the CORESETs that correspond to the first carrier and fall within the second BWP, where the first carrier includes the first BWP and the second BWP; or in a case that the at least one CORESET is configured per BWP, the first indication information is used to instruct the terminal to monitor at least one CORESET of all CORESETs corresponding to the second BWP, and the seventh step above specifically includes:

monitoring, based on indication of the first indication information, the PDCCH in the at least one CORESET of all the CORESETs corresponding to the second BWP.

Optionally, in a case that the terminal is switched from a first BWP to a second BWP, the computer program is configured to be executed by the processor 801 to further implement following step:

an eighth step, detecting a downlink control information (DCI) parameter corresponding to the second BWP, when a DCI parameter of the first BWP is different from the DCI parameter of the second BWP; and/or, detecting, within the second BWP, DCI transmitted by a network device in a CORESET corresponding to the second BWP, when a center frequency of the first BWP is different from a center frequency of the second BWP.

Optionally, the configuration information of each of the at least one CORESET includes at least one of: time-frequency resource information of the CORESET, a set of aggregation levels at which a PDCCH requires to be blindly detected in the CORESET, the number of PDCCH candidate resources on which a PDCCH requires to be blindly detected in the CORESET at each aggregation level, or a DCI parameter of a PDCCH that requires blind detection in the CORESET.

For the analysis of the related content of the above first to seventh steps, reference may be made to the foregoing method embodiments, and details are not described herein again. In addition, the terminal 800 can implement the processes implemented by the terminal in the foregoing embodiments. To avoid repetition, details are not described herein again. It should be noted that the present disclosure does not limit a sequence of the above steps performed by the terminal, and the execution sequence of the above steps should be determined by functions and internal logics of respective steps, that is, the sequence number of the above steps should not constitute any limitation to implementation processes of the embodiments of the present disclosure.

In the embodiment of the present disclosure, after a terminal is configured with one or more CORESETs, the one or more CORESETs can be configured per carrier or per BWP. When the terminal operates in a BWP operating mode, the terminal can select a CORESET that needs to be monitored from the pre-configured CORESET(s) in accordance with configuration information of at least one CORESET transmitted by a network device, and can monitor a PDCCH in the CORESET that needs to be monitored in accordance with configuration information of at least one CORESET. Therefore, a terminal can achieve PDCCH blind detection in a BWP operating mode.

Those skilled in the art should appreciate that the embodiments of the present disclosure may be provided as a method, a system, or a computer program product. Therefore, the embodiments of the present disclosure may take forms of an entirely hardware embodiment, an entirely software embodiment, or an embodiment combining software and hardware. Moreover, the embodiments of the present disclosure may take the form of a computer program product implemented on one or more computer available storage media (including but not limited to disk storage, CD-ROM, optical storage), which include computer available program codes.

Embodiments of the present disclosure are described with reference to flowcharts and/or block diagrams of methods, devices (systems), and computer program products according to embodiments of the present disclosure. It should be understood that each process and/or each block in the flowcharts and/or the block diagrams, and combinations thereof can be implemented by computer program instructions. These computer program instructions may be provided to a processor of a general-purpose computer, a special-purpose computer, an embedded processor, or other programmable data processing device to produce a machine, so that the instructions generated by the processor of the computer or other programmable data processing device are used to generate instruction means for implementing the functions specified in one or more flows of the flowcharts and/or one or more blocks of the block diagrams.

These computer program instructions may also be stored in a computer-readable memory capable of directing a computer or other programmable data processing device to work in a specific manner, such that the instructions stored in the computer-readable memory produce a manufactured article including an instruction device. The instruction device implements functions specified in one or more flows of a flowchart and/or one or more blocks of a block diagram.

These computer program instructions can also be loaded onto a computer or other programmable data processing device, so that a series of steps can be performed on the computer or the other programmable device to produce a computer-implemented process. The instructions can be executed on the computer or other programmable device to implement steps and functions specified in one or more flows of a flowchart and/or one or more blocks of a block diagram.

Obviously, those skilled in the art can make various modifications and variations to the embodiments of the present disclosure without departing from the scope of the present disclosure. In this way, the present disclosure shall also intend to include these modifications and variations of the embodiments of the present disclosure falling within the scope of claims of the present disclosure and their equivalent technologies.

What is claimed is:

1. A method for monitoring a physical downlink control channel (PDCCH), applied to a network device, and comprising:
   determining configuration information of at least one control resource set (CORESET); and
   transmitting the configuration information of the at least one CORESET to a terminal, wherein the at least one CORESET is configured or per bandwidth part (BWP), and
   one BWP is configured with at least one CORESET;
   wherein in a case that the terminal is switched from a first BWP to a second BWP, the method further comprises:
   transmitting, to the terminal, a downlink control information (DCI) parameter corresponding to the first BWP and a DCI parameter corresponding to the second BWP, when the DCI parameter of the first BWP is different from the DCI parameter of the second BWP; and/or
   transmitting to the terminal, DCI in a CORESET corresponding to the first BWP, and transmitting, to the terminal, DCI in a CORESET corresponding to the second BWP, when a center frequency of the first BWP is different from a center frequency of the second BWP.

2. The method according to claim 1, further comprising:
   transmitting first indication information to the terminal, wherein the first indication information is used to instruct the terminal to monitor at least one complete CORESET and/or at least one incomplete CORESET within a BWP that the terminal currently accesses.

3. The method according to claim 2, wherein in a case that the terminal is switched from a first BWP to a second BWP, the first indication information is used to instruct the terminal to monitor at least one complete CORESET and/or at least one incomplete CORESET within the second MVP.

4. The method according to claim 3, wherein
   the first indication information is used to instruct the terminal to monitor at least one CORESET of all CORESETs corresponding to the second BWP.

5. The method according to claim 1, wherein the configuration information of each of the at least one CORESET comprises at least one of: time-frequency resource information of the CORESET, a set of aggregation levels to be monitored, the number of PDCCH candidates at each aggregation level to be monitored, or a ICI parameter of a PDCCH to be monitored in the CORESET.

6. A method for monitoring a physical downlink control channel (PDCCH), applied to a terminal, and comprising:
   receiving configuration information of at least one control resource set (CORESET), wherein the at least one CORESET is configured per bandwidth part (BWP), and one BWP is configured with at least one CORESET; and
   monitoring the PDCCH in the at least one CORESET in accordance with the configuration information of the at least one CORESET;
   wherein in a case that the terminal is switched from a first BWP to a second BWP, the method further comprises:
   detecting a downlink control information (DCI) parameter corresponding to the second BWP, when a DCI parameter of the first BWP is different from the DCI parameter of the second BWP; and/or
   detecting, within the second BWP, DCI transmitted by a network device in a CORSET corresponding to the second BWP, when a center frequency of the first BWP is different from a center frequency of the second BWP.

7. The method according to claim 6, wherein the monitoring the PDCCH in the at least one CORESET comprises:
   monitoring the PDCCH in at least one complete CORESET and/or at least one incomplete CORESET within a BWP currently accessed by the terminal.

8. The method according to claim 7, wherein the monitoring the PDCCH in the at least one complete CORESET and/or the at least one incomplete CORESET within the BWP currently accessed by the terminal comprises:
   monitoring the PDCCH in at least one complete CORESET and/or at least one incomplete CORESET within a second BWP, in a case that the terminal is switched from a first BWP to the second BWP.

9. The method according to claim 8, wherein the monitoring the PDCCH in the at least one complete CORESET and/or the at least one incomplete CORESET within the second BWP comprises:
   monitoring the PDCCH in at least one CORESET of all CORESETs corresponding to the second BWP.

10. The method according to claim 6, further comprising:
    receiving first indication information transmitted by the terminal, wherein the first indication information is used to instruct the terminal to monitor at least one complete CORESET and/or at least one incomplete CORESET within a BWP that the terminal currently accesses; and
    monitoring, based on indication of the first indication information, the PDCCH in the at least one complete CORESET and/or the at least one incomplete CORESET within the BWP that the terminal currently accesses.

11. The method according to claim 10, wherein, in a case Where the terminal is switched from a first BWP to a second BWP, the first indication information is used to instruct the terminal to monitor at least one complete CORESET and/or at least one incomplete CORESET within the second BWP, and the monitoring, based on indication of the first indication information, the PDCCH in the at least one complete CORESET and/or the at least one incomplete CORESET within the BWP that the terminal currently accesses comprises:
    monitoring, based on indication of the first indication information, the PDCCH in the at least one complete CORESET and/or the at least one incomplete CORESET within the second BWP.

12. The method according to claim 11, wherein
the first indication information is used to instruct the terminal to monitor at least one CORESET of all CORESETs corresponding to the second BWP, and the monitoring, based on indication of the first indication information, the PDCCH in the at least one complete CORESET and/or the at least one incomplete CORESET within the BWP that the terminal currently accesses comprises:
    monitoring, based on indication of the first indication information, the PDCCH in the at least one CORESET of all the CORESETs corresponding to the second BWP.

13. The method according to claim 6, wherein the configuration information of each of the at least one CORESET comprises at least one of: time-frequency resource information of the CORESET, a set of aggregation levels to be monitored, the number of PDCCH candidates at each aggregation level to be monitored, or a DCI parameter of a PDCCH to be monitored in the CORESET.

14. A network device, comprising a processor, a memory, and a program that is stored on the memory and executable on the processor, wherein when executing the program, the processor is configured to:
    determine configuration information of at least one control resource set (CORESET); and
    transmit the configuration information of the at least one CORESET to a terminal;
wherein the at least one CORESET is configured per bandwidth part (BWP), and one BWP is configured with at least one CORESET;
wherein in a case that the terminal is switched from a first BWP to second BWP, the processor is configured to:
    transmit, to the terminal, a downlink control information (DCI) parameter corresponding to the first BWP and a DCI parameter corresponding to the second BWP, when the DCI parameter of the first BWP is different from the DCI parameter of the second BWP; and/or
    transmit, to the terminal, DCI in a CORESET corresponding to the first BWP, and transmitting, to the terminal, DCI in a CORESET corresponding to the second BWP, when a center frequency of the first BWP is different from a center frequency of the second BWP.

15. The network device according to claim 14, wherein the processor is further configured to transmit first indication information to the terminal, and the first indication information is used to instruct the terminal to monitor at least one complete CORESET and/or at least one incomplete CORESET within a BWP that the terminal currently accesses.

16. The network device according to claim 15, wherein in a case that the terminal is switched from a first BWP to a second BWP, the first indication information is used to instruct the terminal to monitor at least one complete CORESET and/or at least one incomplete CORESET within the second BWP.

17. The network device according to claim 16, wherein
the first indication information is used to instruct the terminal to monitor at least one CORESET of all CORESETs corresponding to the second BWP.

18. The network device according to claim 14, wherein the configuration information of each of the at least one CORESET comprises at least one of: time-frequency resource information of the CORESET, a set of aggregation levels to be monitored, the number of PDCCH candidates at each aggregation level to be monitored, or a DCI parameter of a PDCCH to be monitored in the CORESET.

\* \* \* \* \*